United States Patent
Schanzenbach

(12) 
(10) Patent No.: US 6,217,131 B1
(45) Date of Patent: Apr. 17, 2001

(54) METHOD AND DEVICE FOR CONTROLLING A VEHICLE BRAKING SYSTEM IN OPEN LOOP

(75) Inventor: Matthias Schanzenbach, Eberstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/330,958

(22) Filed: Jun. 11, 1999

(30) Foreign Application Priority Data

Jun. 12, 1998 (DE) ............................................... 198 26 133

(51) Int. Cl.⁷ .................. B60T 13/74; B60T 8/00
(52) U.S. Cl. .................... 303/112; 188/1.11 E; 188/158; 188/162; 188/181 T; 188/1.11 L; 303/3; 303/155; 303/20
(58) Field of Search ..................... 188/156, 158, 188/72.1, 1.11 E, 1.11 R, 71.1, 181 T, 162, 1.11 L, 71.8; 318/362, 139, 370; 303/155, 3, 112, 20; 180/65.1–65.4, 165

(56) References Cited

U.S. PATENT DOCUMENTS

| | | | |
|---|---|---|---|
| 4,327,414 | * | 4/1982 | Klein . |
| 4,658,939 | * | 4/1987 | Kircher et al. ........................ 188/156 |
| 4,685,745 | * | 8/1987 | Reihecke ......................... 188/1.11 L |
| 4,784,244 | * | 11/1988 | Carre et al. ........................... 188/162 |
| 4,995,483 | * | 2/1991 | Moseley et al. ...................... 188/162 |
| 5,234,262 | * | 8/1993 | Walenty et al. . |
| 5,366,280 | * | 11/1994 | Littlejohn ................................ 303/3 |
| 5,539,641 | * | 7/1996 | Littlejohn .............................. 303/20 |
| 5,915,504 | * | 6/1999 | Döricht ................................ 188/162 |
| 5,957,246 | * | 9/1999 | Suzuki ............................. 188/181 T |
| 5,962,997 | * | 10/1999 | Maisch . |
| 6,000,507 | * | 12/1999 | Böhm et al. .......................... 188/158 |
| 6,003,640 | * | 12/1999 | Ralea .................................. 188/162 |
| 6,008,604 | * | 12/1999 | Maisch ................................. 318/362 |
| 6,012,556 | * | 1/2000 | Bloschet et al. ..................... 188/158 |
| 6,040,665 | * | 3/2000 | Shirai et al. ......................... 188/162 |

FOREIGN PATENT DOCUMENTS

| | | |
|---|---|---|
| WO 94/24453 | 10/1994 | (WO) . |
| 195 26 645 | 1/1997 | (WO) . |

* cited by examiner

Primary Examiner—Douglas C. Butler
(74) Attorney, Agent, or Firm—Kenyon & Kenyon

(57) ABSTRACT

A method and a device for controlling a vehicle braking system in open loop, having electrically operable control devices at the wheel brakes. The control device is controlled according to a driver's braking input, in at least one operating state, on the basis of the correlation, adjusted by an estimate method, between a variable representing the path of the brake pad, and the braking torque or the braking force at the wheel, and/or on the basis of the zero value of this variable, ascertained by an estimate method, when the brake pads lift off from the disc or drum.

10 Claims, 3 Drawing Sheets

METHOD AND DEVICE FOR CONTROLLING A VEHICLE BRAKING SYSTEM IN OPEN LOOP

FIELD OF THE INVENTION

The present invention relates to a method and a device for controlling a vehicle braking system in open loop.

BACKGROUND INFORMATION

One demand on the closed-loop control system of a vehicle braking system is the correct adjustment of the clearance (air gap) between the brake pad and the brake disc. In the classic hydraulic brake, gaskets provide for the withdrawal of the piston in the pressureless state, and thus for the lifting of the brake pads. In connection with the electromechanical brake, in which the brake application is effected, e.g., by an electric motor, the clearance must be actively adjusted by sending the current through the actuator in the negative direction. Motor-vehicle wheel brakes operated by electric motors are known, for example, from PCT Publication No. WO 94/24453 or German Published Patent Application No. 19 526 645. The size of the clearance cannot be detected by a braking-torque or braking-force sensor. Therefore, the clearance is adjusted on the basis of a path signal (travel path of the brake pads), e.g., based on a motor rotational angle, which is in relation to the travel path of the brake pads as defined by a fixed characteristic curve. In this context, the exact knowledge of the zero path or of the zero angle, at which the brake pads just contact the brake disc, is important. Furthermore, if the intention is to use only one controller for the braking torque or the braking force, the correlation between the path variable and the controlled variable is crucial.

SUMMARY OF THE INVENTION

An object of the present invention is to specify measures by which this zero variable and/or this correlation can be ascertained.

The design approach, described in the following, sets forth a reliable, precise procedure for determining the zero path or the zero angle at which the brake pads have in fact just contacted or just released the brake disc or brake drum.

This zero variable is known at any time by the estimation, so that a reliable clearance adjustment is also possible after brakings at rest and/or additional test brakings for identification of the zero variable. The need for a scanning to the zero point is eliminated. so that no time is lost in adjusting the clearance. The described procedure estimates the zero point at any instant on the basis of the braking-torque signal or the brake-application force signal and the path or angle signal, it being possible to adjust the clearance quickly and correctly even after a quick-stop braking.

Because of the pronounced offset drift of the torque or force sensor, as well as due to appearances of wear, and temperature influences, it cannot be assumed that the contact angle of the brake pads with the disc will not change during a braking. Furthermore, a faulty and/or drift-affected angle measurement can invalidate the result. These influences are taken into account by the constant estimation of the zero point. A constant adjustment of the torque or force sensor takes place, errors in detecting the path or angle are compensated, and characteristic curves which represent the characteristic properties of the brake are adapted.

In this manner, a quick and accurate clearance adjustment is made possible, even using a closed-loop braking-torque control, in all operating states, i.e., at standstill, as well.

If an open-loop control of the wheel brakes is carried out within the framework of a closed-loop braking-moment or braking-force control using a single controller, the described procedure ensures that the correlation between the measured path signal and the torque- or force signal, used in so doing, is constantly adapted. In this manner, the open-loop control is improved above all with a view to the comfort during braking (no sudden change during the switch-over from the measured value to a calculated) and during the adjustment of the clearance.

DETAILED DESCRIPTION

Figure 1:
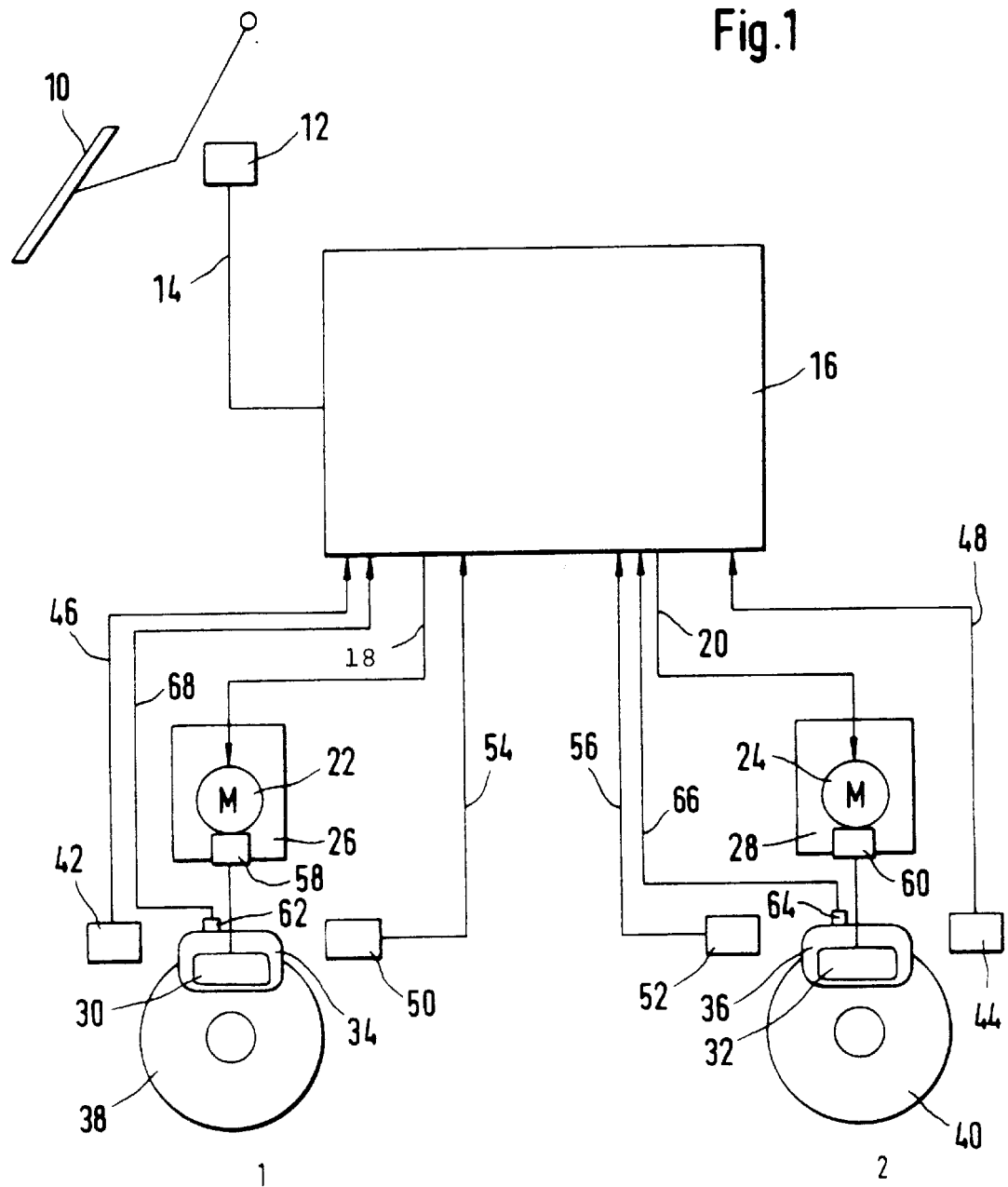
FIG. 1 shows a synoptic block diagram of a braking system having application of the brakes by an electric motor according to the present invention, using a wheel pair as an example.

FIG. 1 shows a synoptic block diagram of a braking system having application of the brakes by an electric motor, using a wheel pair as an example. This wheel pair could be allocated to one axle or to a diagonal of the vehicle. The vehicle brake pedal is represented by 10. The driver's braking input is detected using sensor system 12 by measuring the angle, path and/or force, and is fed via lines 14 to an electronic control system 16. In one advantageous layout, this control system is composed of decentrally distributed control units. Sensor system 12, as well as, at least partially, electronic control system 16, are redundantly designed. The electronic control system actuates electric motors 22 and 24 via output lines 18 and 20, for example, by a pulse-width-modulated voltage signal, using an H-bridge output stage. In one advantageous exemplary embodiment, commutator direct-current motors are used. The electric motors 22, 24 are part of brake actuators 26 and 28. The rotatory movements of these motors 22, 24 are converted in the downstream gear stages 58 and 60 into translatory movements which lead to displacements of brake pads 30 and 32. The brake pads are guided in calipers 34 and 36 and act on brake discs 38 and 40 of wheels 1 and 2. Moreover, in one preferred exemplary embodiment, provision is made for an electrically operable spring-powered brake, with whose aid the brake actuator 26, 28 can be retained in the prevailing position, so that the associated electric motor 22, 24 can be switched into the currentless state. The position of the brake actuator 26, 28 is then retained without energy consumption.

Employed at each wheel 1, 2 are force or torque sensors 42 and 44, whose signals are fed to electronic control system 16 via measuring lines 46 and 48. In one design variant, the axial supporting forces of the actuators 26, 28 during a braking process are measured by these sensors 42, 44, and thus form a measure for the normal forces acting on the brake discs 38, 40. This variant is named in the following force measurement. Therefore, understood by braking force is the force with which the brake shoes press against the brake disc or drum. In another design variant, the radial supporting forces of the brake pads are measured, and thus form a measure for the friction forces or their friction moments occurring in the brake discs 38, 40. This measurement—as well as the use of a direct torque sensor—is designated in the following as torque measurement. In addition, the wheel speeds are detected using sensors 50 and 52, and are transmitted to control system 16 via input lines 54 and 56. Provision is further made for angular-position sensors 62 and 64, whose signals are fed to control system 16 via lines 66 and 68. In one preferred exemplary embodiment, these angular-position sensors are Hall-effect sensors which, for example, detect the revolution of the electric motor 22, 24 of the associated brake actuator 26, 28 and deliver several pulses per revolution, the number of pulses being a measure for the angle covered, and thus for the path covered. In other exemplary embodiments, other sensors (e.g. variable-inductance sensing elements, potentiometers, etc.) are used for measuring the path or angle.

Setpoint values for the individual wheel brakes or groups of wheel brakes are determined in electronic control system 16 from the detected braking input provided by the driver, in accordance with pre-programmed families of characteristics. For example, these setpoint variables correspond to the braking torques or braking forces to be adjusted at a wheel or a wheel pair 1,2, whose quantities are a function, inter alia, of the axle load distribution of the vehicle. From the ascertained, possibly wheel-individual setpoint values, system deviations are determined by comparison with the actual values of the braking forces or braking torques measured in sensors 42 and 44, the system deviations being fed to controller algorithms, for example, in the form of time-discrete PID (proportional-plus-integral-plus-derivative controllers) controllers. The controlled variable of this controller is used to drive the electric motors 22, 24, with corresponding drive signals being output via lines 18 and 20. The point of time for the clearance adjustment is at the end of a braking process.

Figure 2:
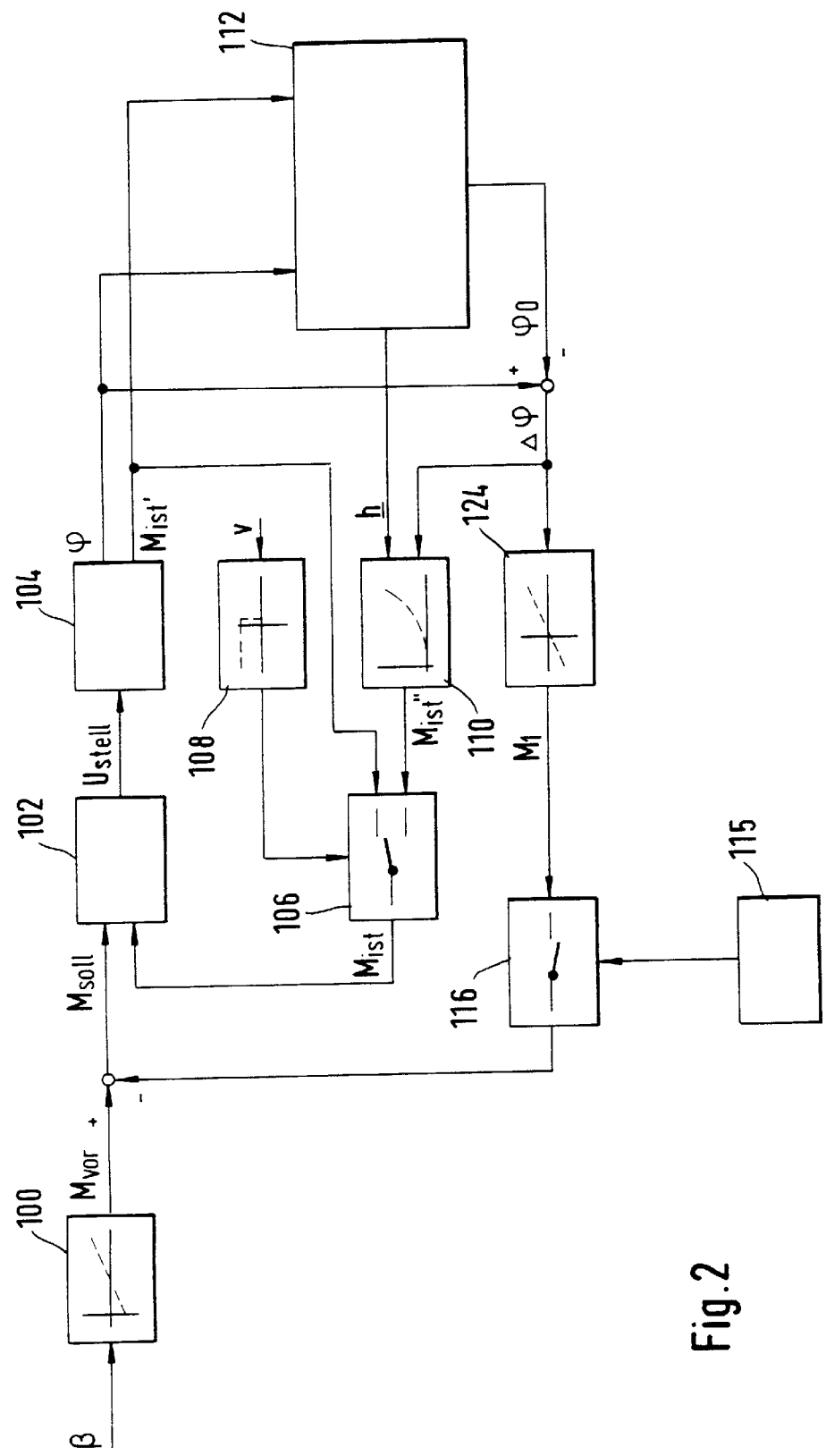
FIG. 2 shows a flow chart of a braking-torque controller for a wheel brake.

FIG. 2 shows a flow diagram of an example of a controller structure for a wheel brake having a torque controller. The following described procedure is used in the preferred exemplary embodiment in conjunction with such a controller structure. In other embodiments, different structures are used, as well. For example, the following described procedure can also be used when the clearance is adjusted within the framework of a closed-loop angle or position control (zero-point determination as described in the following); the control of the braking process is carried out as a closed-loop torque or braking-force control.

Actuating angle β of the brake pedal 10 is detected using sensors 12 shown in FIG. 1. On the basis of characteristic curve 100, which represents a desired pedal-path/braking-torque characteristic, a braking-torque setpoint value MVOR is determined from the actuating angle of the brake pedal. In one preferred exemplary embodiment, characteristic curve 100, i.e., the desired pedal-path/braking-torque characteristic, is predefined in such a way that a negative braking-torque setpoint selection results in the range of the released brake pedal. The meaning of the negative braking-torque setpoint value at an actuating angle 0 of the brake pedal, i.e., given a released brake pedal, is the setpoint selection of a predetermined clearance adjustment.

During the travel of the vehicle, the application force of the brakes is adjusted within the framework of a closed-loop braking-torque control. The braking-torque setpoint value MVOR, ascertained from characteristic curve 100, is fed as braking-torque setpoint value MSOLL to controller 102. The controller includes a control algorithm, in one preferred exemplary embodiment, a control algorithm having a proportional component, an integral component, and a differential component having proven to be suitable. Controller 102, as a function of setpoint variable MSOLL and of actual torque MIST, calculates a controlled variable U in accordance with the implemented control algorithm, controlled variable U being supplied to controlled system 104, i.e., to the electrically operable brake actuator 26, 28. Controlled system 104 is provided with measuring devices for ascertaining rotational angle (p of the rotor of the electric motor 22, 24, as well as for ascertaining braking torque MIST'. The measured actual braking torque is fed back, via switching element 106, as actual braking torque MIST to controller 102. Switching element 106 transmits the measured braking-torque value as actual braking-torque value to controller 102 when the vehicle velocity exceeds a predefined limiting value. In this context, controller 102 brings the actual braking torque more into line with the braking-torque setpoint value, and thus with the driver input.

Traveling speed V is determined on the basis of at least one wheel speed according to known procedures. It is fed to a threshold switching element 108 which monitors for the undershooting of a predefined limiting value of, e.g., several kilometers per hour. If the traveling speed is above this limiting value, i.e., in the case of greater traveling speeds, switching element 106 remains in the position indicated, while if the traveling speed falls below the limiting value, a corresponding signal switches switching element 106 over into the position not shown. In this position, switching element 106 couples the calculated actual torque MIST" to the actual torque MIST fed to the controller.

At low speeds in the range of standstill, braking-torque signal MIST' is no longer correlated with the application force of the wheel brakes. Therefore, a torque signal, which was determined from at least the rotational angle of the electric motor 22, 24, is coupled back to controller 102. For this purpose, provision is made for a characteristic curve 110, in which the rotational angle of the electric motor is converted into a braking torque MIST". Used in so doing as the rotational angle is rotational angle Δφ, which is determined in node (estimator) 112 from rotational angle φ, measured at controlled system 104, and zero angle φ0 which exists when the brake pads 30, 32 are lifted off from the disc or drum. The difference between these two variables forms the absolute rotational angle Δφ which is fed to characteristic curve 110. Zero angle φ0 and/or characteristic-curve parameters h are estimated by estimator 112 in accordance with measured rotational angle φ and measured braking torque MIST' within the framework of the following described procedure.

If the conditions (block 115) exist for a clearance adjustment, switching element 116 is closed. The conditions are, e.g., released brake pedal 10 (e.g. negative torque input), and motor rotational angle φ being in the range of zero angle φ0. A component M1 which, on the basis of a characteristic curve 124, is linked to rotational angle Δφ, is connected to setpoint torque MVOR. Thus, if the conditions for the clearance adjustments are present, then the setpoint torque is varied on the basis of the motor rotational angle, and becomes 0 precisely when the adjusted motor rotational angle corresponds to the desired clearance. If the rotational angle is too great (positive Δφ), then, as a result of the superimposition of M1, the setpoint torque is reduced, so that a negative system deviation at the input of controller 102 leads to a negative output voltage, and thus to a removal of the brake pads 30, 32 of the brake disc or drum. In the case of rotational angles which are too small, i.e., given negative Δφ, the process is reversed.

The accuracy of characteristic curve 110 and the determination of zero angle φ0 are crucial for the functioning method and the comfort of such a closed-loop control.

Figure 3:
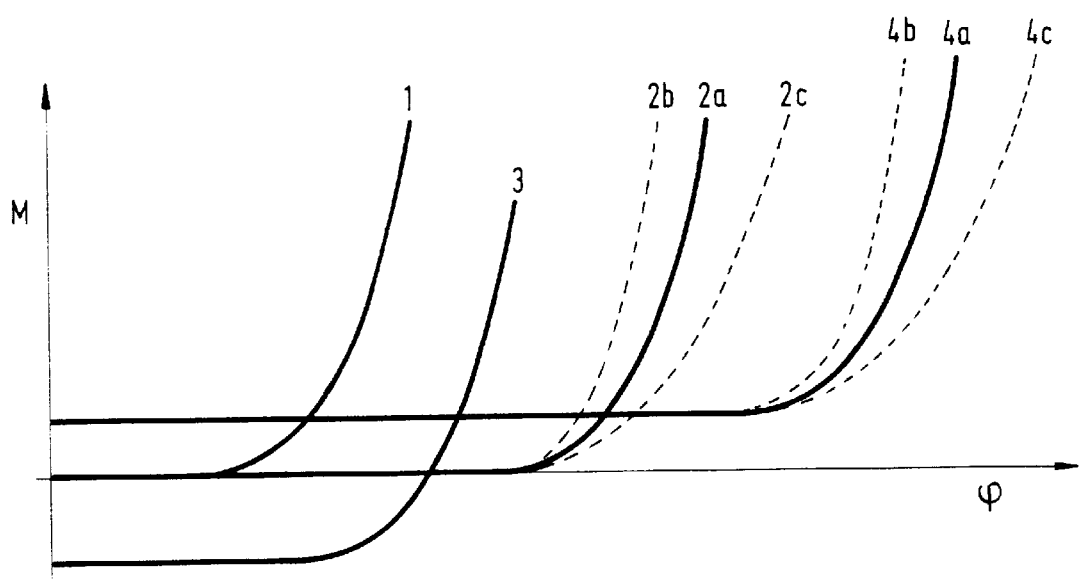
FIG. 3 shows, by way of example, the variation of the torque/angle characteristic curve.

FIG. 3 shows various motor-angle braking-torque characteristic curves of the actuator. The measured braking torque M (corresponds to MIST') is plotted over measured angle φ. Characteristic curve 1 shows a situation with low pad wear, average temperature, and non-existing sensor offset; characteristic curve 2a shows a situation with great pad wear, average temperature, and non-existing sensor offset; characteristic curve 2b shows a situation with great pad wear, low temperature, and non-existing sensor offset; characteristic curve 2c shows a situation with great pad wear, high temperature, and non-existing sensor offset; characteristic curve 3 shows a situation with average pad wear, average temperature, and negative sensor offset; characteristic curve 4a shows a situation with very great pad wear, average temperature and positive sensor offset; characteristic curve 4b shows a situation with very great pad wear, low temperature, and positive sensor offset; characteristic curve 4c shows a situation with very great pad wear, high temperature, and positive sensor offset.

One is able to see the great variation of the characteristic curves as a function of the variables indicated, which makes it necessary to adapt the characteristic curve to the changing marginal conditions for optimal control.

In one approximation, the characteristic curve can be represented as a quadratic equation, a compression or elongation of the characteristic curve being obtained on the basis of the temperature influence, a horizontal shift being obtained on the basis of the pad wear or a temperature-caused thickening of the brake disc 38, 40, and a vertical shift of the characteristic curve being obtained on the basis of the sensor offset. Yielded thus is:

$$M = m_{temp} * s_0 * (\phi_{absolut} - \phi 0)^2 + M_{offset} \quad (1)$$

where M=braking torque s0=brake-specific constant

φ0=zero angle $\phi_{absolute}$=rotational angle $m_{temp}$=factor by which the characteristic curve is compressed or elongated based on the brake-specific constant $M_{offset}$=sensor offset error If there is no brake-pad wear, no temperature stress and no offset drift, the braking-torque characteristic is a function of the motor rotational angle, based on the following equation: $M = S_0 * \phi_{absolut})^2$. Since both the rotational angle and the braking torque (or the application force) are measured, the missing parameters can be estimated from these variables. In principle, there are two possibilities in doing this, an offline or an online estimation. In the offline estimation, the parameters sought are estimated from a number of measuring results. In the online estimation, at each step, a new correction vector, which is composed both of the newest measuring results and the previous estimating result, is added to the estimating result as well.

The offline estimation shall be described first.

Yielded from equation 1 is:

$$M = m_{temp} \cdot s_0 \cdot \phi_{absolut}^2 - 2 \cdot m_{temp} \cdot s_0 \cdot \phi_0 \cdot \phi_{absolut} + (m_{temp} \cdot s_0 \cdot \phi_0^2 + M_{offset}) \quad (2)$$

If several series of measurements are included, then the following matrix equation results:

$$\underbrace{\begin{bmatrix} M_1 \\ \vdots \\ M_n \end{bmatrix}}_{M} = \underbrace{\begin{bmatrix} s_0 \cdot \varphi_{absolut_1}^2 & -2 \cdot s_0 \cdot \varphi_{absolut_1} & 1 \\ \vdots & \vdots & \vdots \\ s_0 \cdot \varphi_{absolut_n}^2 & -2 \cdot s_0 \cdot \varphi_{absolut_n} & 1 \end{bmatrix}}_{\Phi} \cdot \underbrace{\begin{bmatrix} m_{temp} \\ m_{temp} \cdot \varphi_0 \\ m_{temp} \cdot s_0 \cdot \varphi_0^2 + M_{offset} \end{bmatrix}}_{p} \quad (3)$$

If matrix Φ is not quadratic, then equation 3 cannot be resolved in this form, since it is under-defined for n<3, and over-defined for n>3. However, for the case of n>3, a regression parabola can be created, so that a weighting criterion is minimized. If an error vector e is introduced, then equation (3) can be resolved as follows:

$$e = M - \Phi \cdot p \quad (4)$$

Thus, it is now only necessary to find a suitable criterion for the minimization of the error. For example, this criterion can be the sum of the error squares.

$$I = \Sigma e_i^2 = e^T \cdot e \quad (5)$$

$$I = (M - \Phi \cdot p)^T \cdot (M - \Phi \cdot p) = (M^T - p^T \Phi^T)(M - \Phi \cdot p) = M^T M - 2M^T \Phi p + p^T \Phi^T \Phi p \quad (6)$$

For minimization, the first partial derivative is formed and set at zero.

$$\frac{\partial I}{\partial \underline{p}} = -2\Phi^T \underline{M} + 2\Phi^T \Phi \underline{\hat{p}} = \underline{0} \quad (7)$$

Thus, following for the estimation $\hat{p}$ is:

$$\hat{p} = (\Phi^T \Phi)^{-1} \Phi^T M = \Phi^+ M \quad (8)$$

Therefore, the multiplication of the pseudo-inverse matrix $\Phi^+$ by the measuring vector M is yielded as the solution for the estimation vector $\hat{p}$. The unknown variables φ0, $m_{temp}$, and Moffset can then be calculated from the estimation vector.

In the following, the online estimation is described more precisely.

A recursive calculation of the parameters presents itself for operation in the vehicle, in order to constantly adjust the parameters during operation as well. The recursive solution can be derived from the offline method, by writing equation (8) for the kth instant and expanding it to the k+1-th instant.

$$\hat{p}(k) = (\Phi^T(k)\Phi(k))^{-1} \Phi^T(k) M(k) \quad (9)$$

In this case, the matrices $\Phi$ and M are composed as follows:

$$\underline{\Phi}(k) = \begin{bmatrix} s_o \cdot \varphi_{absolut}(1)^2 & -2 \cdot s_o \cdot \varphi_{absolut}(1) & 1 \\ \vdots & \vdots & \vdots \\ s_o \cdot \varphi_{absolut}(k)^2 & -2 \cdot s_o \cdot \varphi_{absolut}(k) & 1 \end{bmatrix} \quad (10)$$

$$\underline{M}(k) = \begin{bmatrix} M(1) \\ \vdots \\ M(k) \end{bmatrix} \quad (11)$$

or for the next sampling step:

$$\underline{\Phi}(k+1) = \begin{bmatrix} \Phi(k) \\ s_0 \cdot \varphi_{absolut}(k+1)^2 & -2 \cdot s_0 \cdot \varphi_{absolut}(k+1) & 1 \end{bmatrix} \quad (12)$$

$$= \begin{bmatrix} \underline{\Phi}(k) \\ \underline{\phi}(k+1) \end{bmatrix}$$

$$\underline{M}(k+1) = \begin{bmatrix} M(k) \\ m(k+1) \end{bmatrix} \quad (13)$$

Thus, valid for the parameter vector in the next step is:

$$\hat{p}(k+1) = (\Phi^T(k+1)\Phi(k+1))^{-1}\Phi^T(k+1)M(k+1) \quad (14)$$

By multiplying out the part outside of the round brackets, yielded finally with equations (12) and (13) is:

$$\hat{p}(k+1) = (\Phi^T(k+1)\Phi(k+1))^{-1} \cdot (\Phi^T(k)M(k)+\phi^T(k+1)m(k+1)) \quad (15)$$

From equation (8), one obtains:

$$\Phi^T(k)M(k) = (\Phi^T(k)\Phi(k))\hat{p}(k) \quad (16)$$

If equation (16) is inserted into equation (15), one obtains:

$$\hat{p}(k+1) = (\Phi^T(k+1)\Phi(k+1))^{-1} \cdot (\Phi^T(k)\Phi(k)\hat{p}(k)+\phi^T(k+1)m(k+1)) \quad (17)$$

In this case, the following transformation can be carried out:

$$\underline{\Phi}^T(k+1)\underline{\Phi}(k+1) = \begin{bmatrix} \underline{\Phi}(k) \\ \underline{\phi}(k+1) \end{bmatrix}^T \begin{bmatrix} \underline{\Phi}(k) \\ \underline{\phi}(k+1) \end{bmatrix} \quad (18)$$

$$= [\underline{\Phi}^T(k) \quad \underline{\phi}^T(k+1)] \begin{bmatrix} \underline{\Phi}(k) \\ \underline{\phi}(k+1) \end{bmatrix}$$

$$= \underline{\Phi}^T(k)\underline{\Phi}(k) + \underline{\phi}^T(k+1)\underline{\phi}(k+1)$$

or $$\Phi^T(k)\Phi(k) = \Phi^T(k+1)\Phi(k+1) - \phi^T(k+1)\phi(k+1) \quad (19)$$

Yielded thus with equations (19) and (17) is:

$$\hat{p}(k+1) = (\Phi^T(k+1)\Phi(k+1))^{-1} \cdot (\Phi^T(k+1)\Phi(k+1)\hat{p}(k)-\phi^T(k+1)\phi(k+1)\hat{p}(k)+\phi^T(k+1)m(k+1)) \quad (20)$$

$$\hat{p}(k+1) = \hat{p}(k) + (\Phi^T(k+1)\Phi(k+1))^{-1}\phi^T(k+1) \cdot (m(k+1)-\phi(k+1)\hat{p}(k)) \quad (21)$$

For simplification, the column vector q is introduced.

$$q(k+1) = (\Phi^T(k+1)\Phi(k+1))^{-1}\phi^T(k+1) \quad (22)$$

Following thus is:

$$\hat{p}(k+1) = \hat{p}(k) + q(k+1) \cdot (m(k+1)-\phi(k+1)\hat{p}(k)) \quad (23)$$

However, according to equation (4), the term in the brackets represents precisely the estimate of the model error, which is calculated with the assistance of the parameter vector estimated one step before.

$$\hat{e}(k+1) = m(k+1)-\phi(k+1)\hat{p}(k) \quad (24)$$

Resulting therefore for the parameter estimate vector is $$\hat{p}(k+1) = \hat{p}(k) + q(k+1) \cdot \hat{e}(k+1) \quad (25)$$

Thus, the parameter estimate vector for the k+1-th step is calculated from the estimate vector of the last sampling step, the weighting vector q and the estimate of the model error. q can be calculated as known, in simplified manner, according to the following schema:

$$\underline{q}(k+1) = \frac{\underline{P}(k)\underline{\phi}^T(k+1)}{1 + \underline{\phi}(k+1)\underline{P}(k)\underline{\phi}^T(k+1)} \quad (26)$$

$$P(k+1) = P(k) - q(k+1)\phi(k+1)P(k) \quad (27)$$

Thus, a recursive online estimation of the parameter vector can be carried out with the assistance of equations (26), (27), (24) and (25).

The estimation can be improved by a weighting of the working point. Usually, the characteristic curve will not be as noisy in the high torque range as in the lower range; therefore, the measured values at high torques should be weighted more strongly. In addition, the introduction of a forget factor presents itself, so that errors which are brought in have less and less effect during progressive estimation. In this case, an estimation according to the IV method known from the literature would provide a solution.

The weighting vector q in equation (26) is calculated from the covariance matrix P, as well as from the new measured value of the motor rotational angle φ. In the following, the new measured value should not go directly into the weighting vector, but rather a calculated value $\phi_b$ (equation 30 and 31), which is derived from the previously determined estimate values, should be used as weighting. In this manner, the error due to a disturbed signal is reduced. This holds true primarily when one of the two measured signals exhibits a better signal-to-noise ratio than the other. Assuming the torque signal is the signal having the greater reliability, the result is:

$$\underline{q}(k+1) = \frac{\underline{P}(k)\underline{w}(k+1)}{1 + \underline{\phi}(k+1)\underline{P}(k)\underline{w}(k+1)} \quad (28)$$

w being composed as follows:

$$\underline{w}(k+1) = \begin{bmatrix} s_0 \cdot \varphi_b^2 \\ -2 \cdot s_0 \cdot \varphi_b \\ 1 \end{bmatrix} \quad (29)$$

where $$m(k+1) = w(k+1)^T \cdot \hat{p}_h(k)$$

and $$\hat{\underline{p}}_h(k) = \begin{bmatrix} \hat{p}_1(k) \\ \hat{p}_2(k) \\ \hat{p}_3(k) \end{bmatrix} \quad (30)$$

the result for angle $\varphi_b$ is:

$$\varphi_b = \frac{s_0 \cdot \hat{p}_2(k) + \sqrt{(s_0 \cdot \hat{p}_2(k))^2 - s_0 \cdot \hat{p}_1(k) \cdot (\hat{p}_3(k) - m(k+1))}}{s_0 \cdot \hat{p}_1(k)} \quad (31)$$

In this case, auxiliary estimate vector $\hat{p}_h(k)$ is composed recursively from the finally calculated value, as well as from the last estimate of the parameter vector. The weighting is effected with variable $\gamma$, which should lie in the range between 0 and 1:

$$\hat{p}_h(k) = (1-\gamma) \cdot \hat{p}_h(k-1) + \gamma \cdot \hat{p}(k-1) \quad (32)$$

Also valid is $$\hat{e}(k+1) = m(k+1) - \underline{\phi}(k+1)\hat{p}(k) \quad (33)$$

$$\hat{p}(k+1) = \hat{p}(k) + \underline{q}(k+1) \cdot \hat{e}(k+1) \quad (34)$$

$$\underline{P}(k+1) = \frac{1}{\sigma(k+1)} \cdot (\underline{P}(k) - \underline{q}(k+1)\underline{\phi}(k+1)\underline{P}(k)) \quad (35)$$

In this case, σ represents the forget factor, which can be changed depending on the working point. It is suggested to increase the forget factor at high torques, since it must be expected that this range will be less disturbed than the range of low braking torques. The factor should lie in the range between 0.95 and 0.99.

It is also necessary in the case of recursive estimate methods that the system be appropriately excited. Given low excitation, no reliable statement can be made about the estimate parameters. If the system is not excited, then, in the extreme case, one would have k value pairs for the identification of the parameters which all would have been recorded in response to the same braking torque. Since in this case, the rank of matrix Φ coincides on 1, (all lines of the equation are contingent linearly upon one another), an estimate of the parameters sought is not possible. Therefore, either the forget factor is increased in response to a strong excitation, while it is reduced in response to low excitations, or the estimate is discontinued during static braking phases, and is only started again in response to dynamic operations.

With the assistance of these methods, it is possible during a braking to calculate the parameters for determining the clearance, and to detect and compensate for the offset drift of the torque sensor 42, 44, as well.

Besides ascertaining a rotational-angle signal, in other embodiments, the method is also used for a path measurement (e.g., measuring the path of the brake pads 30, 32).

In addition to utilization for an electromechanical brake, this procedure can also be used for adjusting the clearance in the case of other braking systems, e.g., for electrohydraulic or electropneumatic brakes which are provided with the appropriate sensors.

What is claimed is:

1. A method for controlling according to a control arrangement a vehicle braking system including a plurality of electrically operable control devices provided at wheel brakes of a vehicle including the vehicle braking system, comprising the steps of:
   determining a variable representing a path of a brake pad of the vehicle braking system;
   measuring one of a braking torque and a braking force at at least one wheel associated with the wheel brakes;
   determining a correlation between the variable representing the path of the brake pad and one of the braking torque and the braking force;
   adjusting the correlation by performing a first estimate method;
   when the brake pad lifts off from one of an associated brake disc and a brake drum of the vehicle braking system, ascertaining a zero value of the variable representing the path of the brake pad by performing a second estimate method; and
   controlling at least one of the plurality of electrically operable control devices according to a braking input provided by a driver of the vehicle, wherein the at least one of the plurality of electrically operable control devices is controlled on the basis of at least one of the correlation and the zero value.

2. The method according to claim 1, wherein each one of the first estimate method and the second estimate method is performed according to one of an online arrangement and an offline arrangement.

3. The method according to claim 1, wherein the step of determining the correlation includes the step of preselecting the correlation as a quadratic equation having parameters determined by a third estimate method.

4. The method according to claim 1, wherein at least one of the correlation and the zero value is adapted by a corresponding one of the first estimate method and the second estimate method to a wear and tear value, a temperature value, and a sensor offset value.

5. The method according to claim 1, wherein the control arrangement is carried out on the basis of one of the braking torque and the braking force, without a sudden change resulting during a switchover operation.

6. The method according to claim 1, wherein at least one of the correlation and the zero value are constantly adapted as a result of a corresponding one of the first estimate method and the second estimate method being performed according to an online arrangement.

7. The method according to claim 1, wherein at least one of the first estimate method and the second estimate method corresponds to a least error squares method.

8. The method according to claim 1, wherein the variable representing the path of the brake pad corresponds to a rotational angle of an electric motor associated with the one of the plurality of electrically operable control devices.

9. The method according to claim 1, further comprising the step of:
   calculating one of the braking torque and the braking force as a function of the variable representing the path of the brake pad, the zero value, and estimated parameters of the correlation.

10. A device for controlling a vehicle braking system of a vehicle according to a control arrangement, comprising:
    a plurality of electrically operable control devices provided at wheel brakes of the vehicle braking system;

an arrangement for determining a variable representing a path of a brake pad of the vehicle braking system;

an arrangement for measuring one of a braking torque and a braking force at a wheel associated with one of the wheel brakes;

an arrangement for determining a correlation between the variable representing the path of the brake pad and the one of the braking torque and the braking force;

an arrangement for adjusting the correlation according to a first estimate method;

ascertaining a zero value of the variable representing the path of the brake pad according to a second estimate method, when the brake pad lifts off from one of an associated brake disc and a brake drum of the vehicle braking system; and an arrangement for controlling at least one of the plurality of electrically operable control devices according to a braking input provided by a driver of the vehicle, wherein, in at least one operating state, the at least one of the plurality of electrically operable control devices is controlled on the basis of at least one of the correlation and the zero value.

\* \* \* \* \*